(12) United States Patent
Yang et al.

(10) Patent No.: US 7,565,110 B2
(45) Date of Patent: Jul. 21, 2009

(54) METHOD FOR DETERMINING RISE OVER THERMAL FOR A REVERSE LINK IN A WIRELESS SYSTEM

(75) Inventors: Yang Yang, Parsippany, NJ (US); Qi Bi, Morris Plains, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 873 days.

(21) Appl. No.: 10/944,289

(22) Filed: Sep. 17, 2004

(65) Prior Publication Data

US 2006/0063545 A1    Mar. 23, 2006

(51) Int. Cl.
*H04B 1/00*    (2006.01)
*H04B 15/00*    (2006.01)

(52) U.S. Cl. ............... 455/63.1; 455/67.11; 455/67.13; 455/114.2; 455/226.3; 370/328; 370/332

(58) Field of Classification Search ............. 455/69, 455/522, 226.1, 226.3, 67.11, 453, 63.1, 455/67.13, 70, 114.2, 134, 135; 370/328, 370/332, 338
See application file for complete search history.

(56) References Cited

U.S. PATENT DOCUMENTS

2005/0026624 A1 * 2/2005 Gandhi et al. ............... 455/453
2006/0045045 A1 * 3/2006 Blessent et al. ............. 370/328

OTHER PUBLICATIONS

International Search Report EP 05 25 5360 dated Nov. 24, 2005.

* cited by examiner

*Primary Examiner*—Tuan A Pham

(57) ABSTRACT

A method for determining rise over thermal for a base station in a wireless communications system is provided. The method comprises receiving a first and second diversity signal, measuring the signal strength of the first and second diversity signals, and estimating the noise floor for the first and second diversity signals. The signal strength rise is determined for the first and second diversity signals based on the measured signal strength and estimated noise floor of the first and second diversity signals respectively. The rise over thermal is then determined based on the determined signal strength rise of the first and second diversity signals.

16 Claims, 4 Drawing Sheets

METHOD FOR DETERMINING RISE OVER THERMAL FOR A REVERSE LINK IN A WIRELESS SYSTEM

BACKGROUND OF THE INVENTION

1. Field of the Invention

This invention relates generally to telecommunications, and more particularly, to wireless communications.

2. Description of the Related Art

A wireless communications system typically employs a plurality of base stations distributed over a geographic region and a plurality of mobile devices. The base stations are typically fixed, and the mobile devices are generally free to move about the geographic region, alternately communicating with one or more of the fixed base stations, depending on a number of factors, such as the quality of communications available with a particular base station.

In general, the overall strength of the total received signals measured in the base station is commonly represented as RSSI (Received Signal Strength Indicator). RSSI is generally comprised of at least two components, a noise floor component and a variable component (also known as noise rise or RSSI rise). The noise floor component of RSSI is the signal level that exists independent of any signals being exchanged between the mobile devices and the base stations. That is, the noise floor is the signal that exists even when the mobile devices and base stations are not communicating. The variable component, on the other hand, is the portion of the RSSI that is caused by the mobile devices communicating with the base station, and, significantly is an indication of reverse interference and is a function of reverse link loading caused by more than one mobile device transmitting signals at substantially the same time. For example, if mobile devices A and B transmit signals at the same time, the signal from mobile device A interferes with the signal from mobile device B, and vice verse. One factor that affects the amount of the variable component of RSSI within a base station is the number of mobile devices and data rates they are actively using to communicate with the base station. Thus, the variable component of RSSI is a useful indicator of reverse link loading, which directly affects capacity and performance of a wireless telephony system.

In a wireless system, a base station normally has multiple paths over which a particular signal may be received. For example, a particular signal may be reflected off of a number of landmarks (e.g., buildings, trees, vehicles, etc.) before reaching the base station. Thus, multiple reflections of the same signal may reach the base station. These reflected signals may be substantially identical, but varied in time and could experience different RF fading, owing to the different paths that they traversed. The multiple signals are useful to create diversity gain, and thus are commonly referred to as diversity signals. Each receive path may have its own RSSI measurement circuit. In the ideal case, the RSSI measurement from the various diversity signals may be the same, as all of the signals are sent with the same energy and with the same path loss.

However, each of the receive paths may have gain variations in base station receiver hardware arising from different gains/losses associated with different components in the receive chain. RSSI is normally measured after passing through many Radio Frequency (RF) components in the receive chain. Thus, any of these components could cause RSSI measurement variations. For example, an RSSI sample at diversity signal A could be −86dBm while the RSSI measurement at diversity signal B is −83dBm. In some extreme cases (e.g., one diversity signal is dysfunctional), the signal difference between two diversity signals could be as high as 20dB. This large differential presents a challenge to the RSSI processing. That is, how to deal with the absolute RSSI measurements from different diversity signals without compromising the RSSI measurement integrity while taking advantage of the multi-path gain.

In prior systems, the variable component of RSSI is calculated from the RSSI measurement and an estimated noise floor. Both are obtained from the RSSI measurements; however, the RSSI measurement can be taken from one diversity signal while the noise floor estimation can be based on another diversity signal. This presents an inconsistent view on the variable component of RSSI and impairs the accuracy of reverse link traffic loading control, leading to degraded reverse link performance on the air interface for high speed data services.

The present invention is directed to overcoming, or at least reducing, the effects of, one or more of the problems set forth above.

SUMMARY OF THE INVENTION

In one aspect of the present invention, a method for controlling a wireless communications system is provided. The method comprises determining signal strength rise for a first diversity signal based on a signal strength and noise floor of the first diversity signal, determining signal strength rise for a second diversity signal based on a signal strength and noise floor of the second diversity signal, and determining rise over thermal based on the determined signal strength rise of the first and second diversity signals.

In another aspect of the present invention, a method for controlling a wireless communications system is provided. The method comprises receiving a first and second diversity signal, measuring the signal strength of the first and second diversity signals, and estimating the noise floor for the first and second diversity signals. The signal strength rise is determined for the first and second diversity signals based on the measured signal strength and estimated noise floor of the first and second diversity signals respectively. The rise over thermal is then determined based on the determined signal strength rise of the first and second diversity signals.

BRIEF DESCRIPTION OF THE DRAWINGS

The invention may be understood by reference to the following description taken in conjunction with the accompanying drawings, in which like reference numerals identify like elements, and in which.

Figure 1:
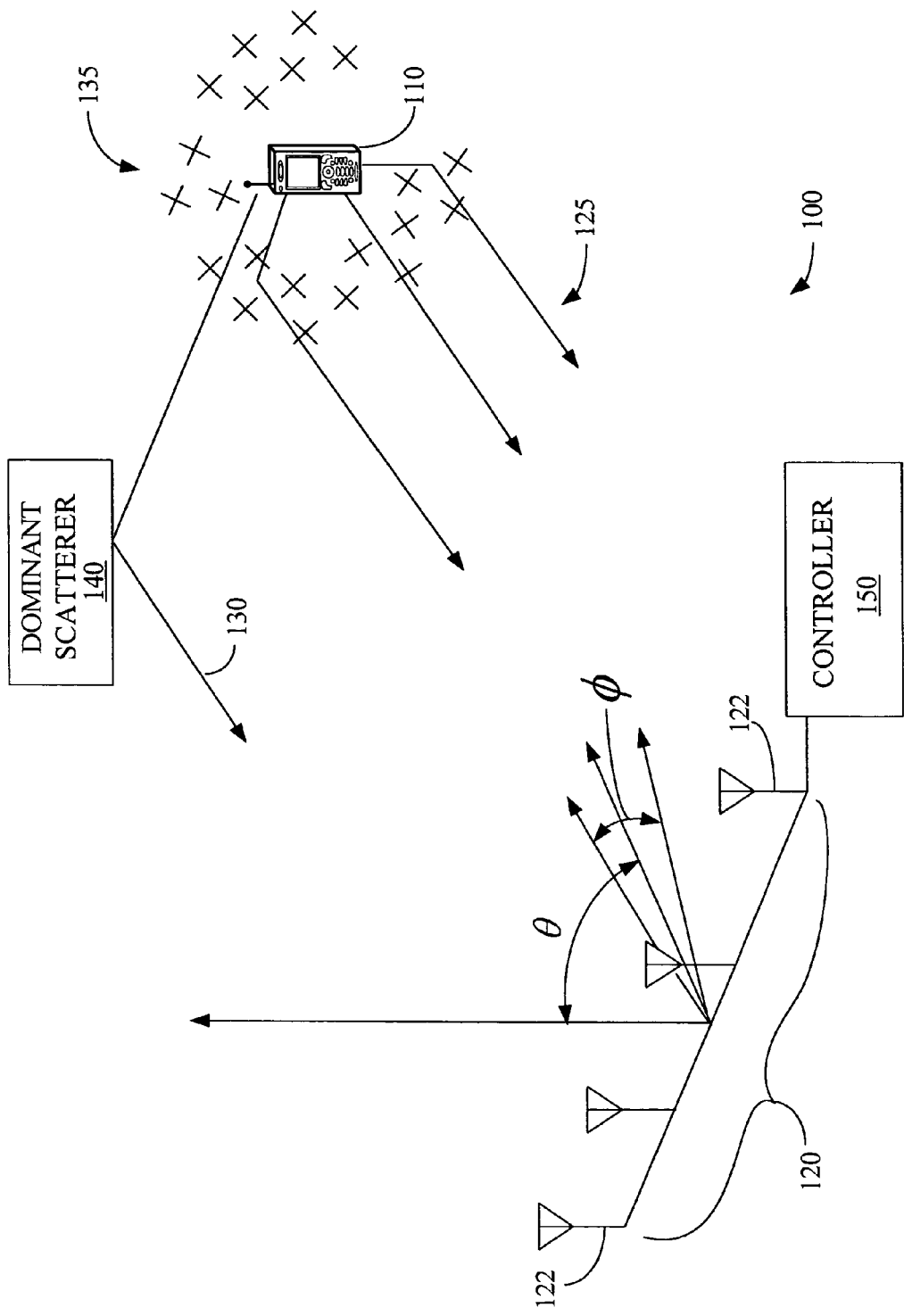
FIG. 1 conceptually illustrates one embodiment of a geometrical model of an exemplary communication channel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

FIG. 1 conceptually illustrates one embodiment of a geometrical model of an exemplary communication channel 100 that may be formed between a mobile device 110 and a base station 120, which may include one or more antennae 122. In the illustrated embodiment, the mobile device 110 is a mobile phone. However, in alternative embodiments, the mobile device 110 may be any device capable of communicating with the base station 120 using the communication channel 100. For example, the mobile device 110 may be a cellular telephone, a personal data assistant, a Global Positioning System receiver, a laptop computer, a desktop computer, a wireless modem, and the like.

Signals 125, 130 from the mobile device 110 may be distorted or otherwise altered as they travel to the base station 120. In one embodiment, the alterations may arise in part because the mobile device 110 is moving. For example, a user may be using the mobile device 110 while walking, riding in a car, and the like. Doppler spreading of the signals 125, 130 from the moving mobile device 110 may shift the signal frequency and/or cause temporal fading of the signals 125, 130. Alternatively, the base station 120 may be in motion. For example, high winds may cause an antenna tower (not shown) supporting the antennae 122 to sway. Persons of ordinary skill in the art should appreciate that the Doppler spreading of the signals 125, 130 may also be referred to using terms such as "Doppler fading," "Doppler shift," and the like.

The signals 125, 130 may be scattered as they travel from the mobile device 110 to the base station 120. In the conceptual illustration shown in FIG. 1, the scattering may include random scattering from many uncorrelated or correlated scatterers 135, such as, trees, vehicles, and the like. The signals 125, 130 may also be scattered by one or more dominant scatterers 140, such as buildings, mountains, and the like. Persons of ordinary skill in the art should appreciate that the various parameters of the random and/or dominant scatterers 135, 140, such as a size, number, distribution, and/or density of the scatterers 135, 140, may depend upon the environment of the mobile device 110 and/or the base station 120. For example, the number and density of scatterers 135, 140 may be much larger in urban environments than in suburban environments.

Scattering of the signals 125, 130 may spread the time delay of the signals 125, 130, at least in part because of variations in the path length from the mobile device 110 to the base station 120. Persons of ordinary skill in the art should appreciate that the time delay spreading may also be referred to using terms such as "multipath delay spread," and the like. Scattering of the signals 125, 130 may also spread the angle-of-arrival of the signals 125, 130. Persons of ordinary skill in the art should appreciate that the angle spreading may also be referred to using terms such as "angle fading," "spatial fading," "spatial diversity," and the like. In the embodiment depicted in FIG. 1, a nominal angle-of-arrival may be denoted by θ and a random angle deviation from the nominal angle-of-arrival may be denoted by the symbol ø. In one embodiment, scattering of the signals 125, 130 may spread the nominal angle-of arrival such that the angle deviation ø is approximately distributed as a Gaussian or uniformly distributed random variable with variance $\sigma_\varnothing^2$. The standard deviation $\sigma_\varnothing$ of the angle deviation is often called the "angle spread" of the signals 125, 130. However, persons of ordinary skill in the art should appreciate that the distribution and/or angle spread of the nominal angle-of-arrival may not always be Gaussian and may depend upon many parameters including, but not limited to, the distribution of the transmitted signals 125, 130, the distribution of the scatterers 135, 140, and the like.

In the illustrated embodiment, the base station 120 is shown utilizing four antennae 122. Those skilled in the art, however, will appreciate that the number of antennae 122 employed on the base station 120 may vary widely depending on a number of design factors. Further, those skilled in the art will appreciate that the principals of the instant invention may be employed in systems configured with any number of antennae 122 without departing from the spirit and scope of the instant invention.

A controller 150 may be communicatively coupled to the base station 120, and, in particular, to the antenna 122. The controller 150 may be used in accurately calculating RoT, and then using the RoT in controlling communications over the channel 100 in accordance with various aspects of the instant invention.

Figure 2:
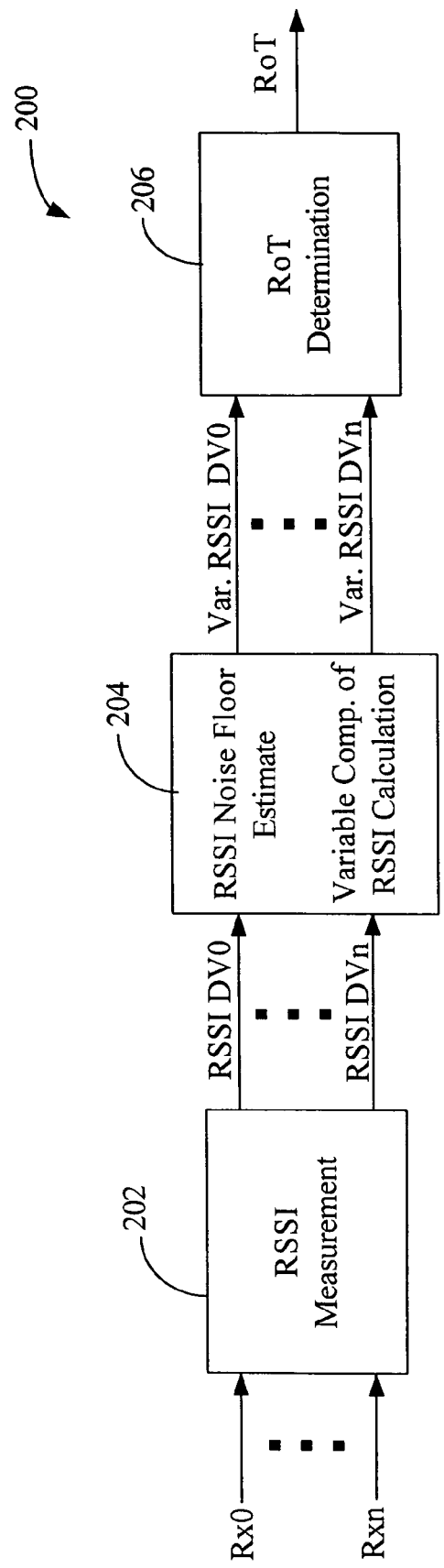
FIG. 2 stylistically depicts a block diagram of one embodiment of a portion of a controller of FIG. 1 useful in determining RoT.

Turning now to FIG. 2, one embodiment of a segment 200 of the controller 150 useful in calculating RoT is illustrated. The process of calculating RoT begins with an RSSI measurement. Signals Rx0-Rxn received on each of the antennae 122 are delivered to an RSSI measurement block 202. The signals Rx0-Rxn received from the various antennae 122 are commonly referred to as diversity signals. The total signal strength is measured for each diversity signal. That is, a separate calculation is performed for each diversity signal Rx0-Rxn to arrive at separate total signal strengths RSSI DV0-RSSI DVn for each diversity signal.

The total signal strength measurements RSSI DV0- RSSI DVn for each of the diversity signals is then delivered to a block 204 where the noise floor is estimated and then used to calculate the variable component of RSSI for each diversity signal. Conventional methodology is used in estimating the noise floor for each diversity signal, and these estimates are then used to calculate the variable component of RSSI (RSSI Rise DV0-RSSI Rise DVn) for each diversity signal. The variable component of RSSI is calculated for each diversity signal by subtracting the noise floor for each diversity signal from the corresponding total strength measurement RSSI DV0-RSSI DVn for each diversity signal. For example, the calculations for a four antennae system are set forth in Table I below.

TABLE I

| | RSSI Measurement | Noise Floor | Variable Component of RSSI (dB) = RSSI Measurement (dBm) − Noise Floor (dBm) |
|---|---|---|---|
| Diversity Signal0 | RSSI DV0 | NF0 | Variable component of RSSI DV0 |

TABLE I-continued

| | RSSI Measurement | Noise Floor | Variable Component of RSSI (dB) = RSSI Measurement (dBm) − Noise Floor (dBm) |
|---|---|---|---|
| Diversity Signal1 | RSSI DV1 | NF1 | Variable component of RSSI DV1 |
| Diversity Signal2 | RSSI DV2 | NF2 | Variable component of RSSI DV2 |
| Diversity Signal3 | RSSI DV3 | NF3 | Variable component of RSSI DV3 |

Instead of taking RSSI samples from various diversity signals and performing an averaging/selection algorithm directly on the RSSI measurements from these diversity signals, this invention focuses on the processing of the variable component of RSSI of each diversity signal, thus maintaining the integrity of the measurement of the variable component of RSSI. This way, the gain variation of individual receive paths may be substantially cancelled (in the subtraction of noise floor from the RSSI measurement for each diversity signal) when the variable component of RSSI is calculated.

After the variable component of RSSI (RSSI DV0-DVn) is derived for each path independently, control transfers to block 206 where various algorithms can be use to perform other post processing to determine an overall Rise over thermal (RoT). For example, the algorithm may be constructed so as to choose the highest variable component of RSSI among the various diversity signals as the RoT. Alternatively, an average variable component of RSSI among the various diversity signals may be calculated. Further, the individual variable components of RSSI may be combined using a weighted algorithm that assigns more importance to certain selected diversity signals.

Once the RoT is calculated, it may be used by the base station 120 to control/limit loading of the base station. That is, the base station may receive a request for a service that will increase the load experienced by the base station 120. For example, the base station 120 may receive a request to increase the data rate of a mobile devices 110 communicating with the base station 120. Alternatively, the base station 120 may receive a request to service a new call from a mobile device 110.

Figure 3:
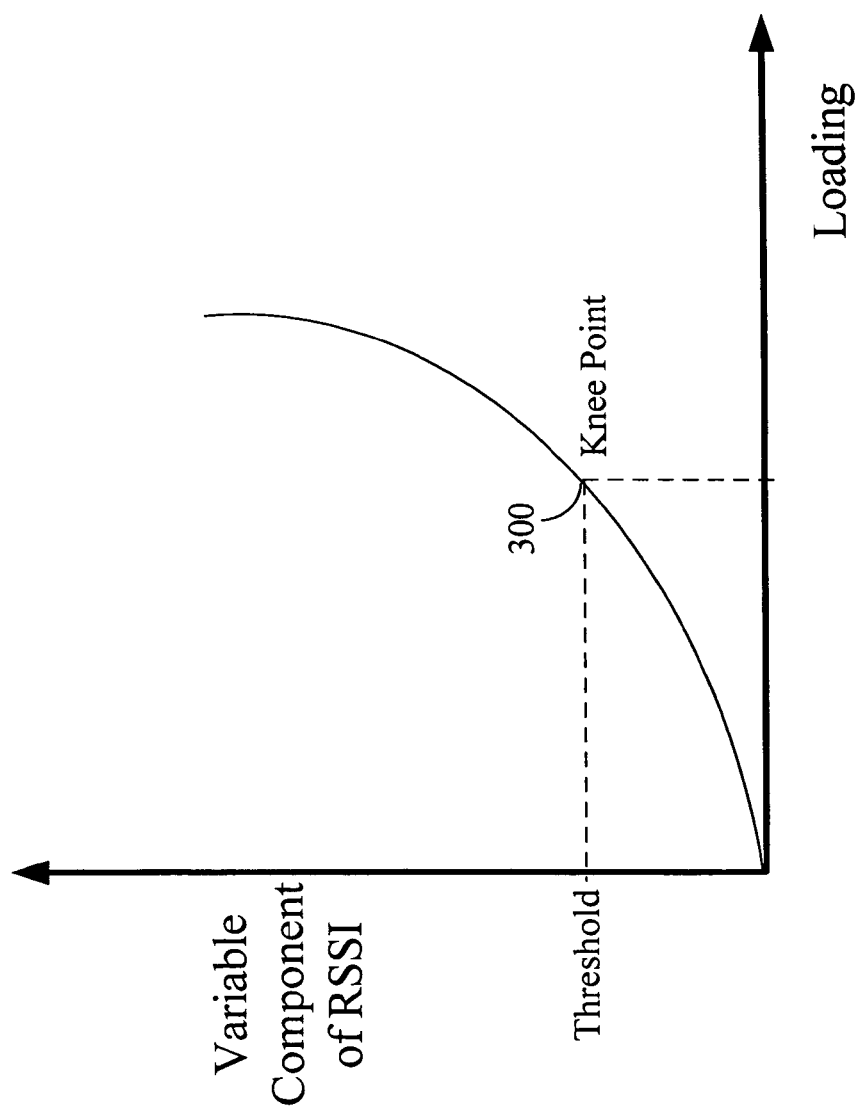
FIG. 3 depicts a graph of RoT versus loading.

As can be seen from the graph of Variable Component of RSSI versus Loading of FIG. 3, the variable component of RSSI experienced by the base station 120 increases relatively slowly out to a knee point 300. Thereafter, the variable component of RSSI (which is an indicator of interference) increases exponentially. Thus, it should be appreciated that once the knee point 300 is reached, establishing one additional call raises the interference level seen by all the mobile devices 110 communicating with the base station 120. The mobile devices 110 will increase their transmit power to maintain their call integrity. This process repeats itself with each new call. As a result, the system performance degrades severely since the mobile devices 110 do not have enough power to overcome the level of interference to achieve the required signal-to-noise ratio (e.g., Eb/Nt) once their maximum transmit power is reached. To protect the system against this performance degradation, CDMA loading may be constrained to a limit, such as the threshold 305, which in the illustrated embodiment corresponds to the knee point 300. Those skilled in the art will appreciate that the threshold may be varied depending upon various design considerations and operating characteristics of the base station and/or wireless network in which the instant invention is deployed.

Figure 4:
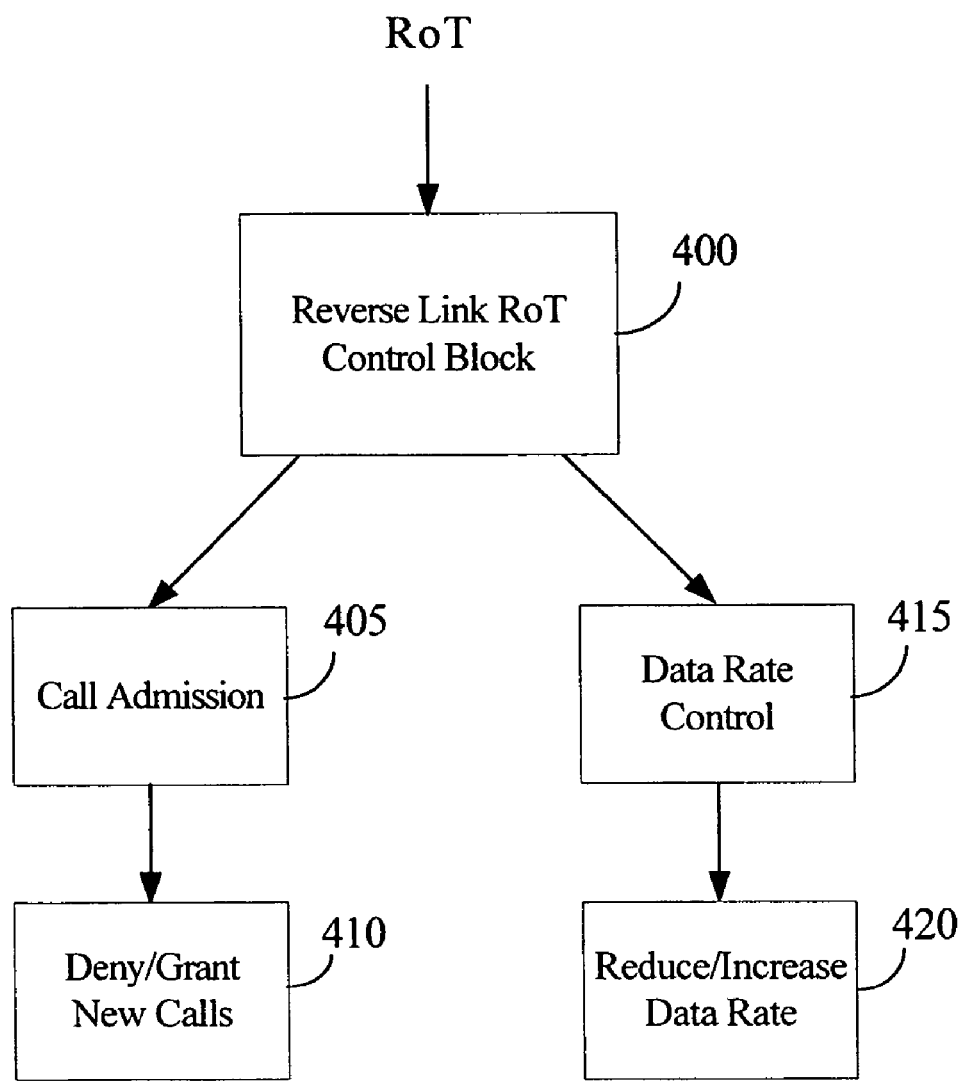
FIG. 4 depicts one embodiment of a flowchart representation of a control scheme that may be implemented in a controller of FIG. 1.

Turning now to FIG. 4, a stylistic representation of one embodiment of a method for controlling the operation of the base station 120 using RoT is shown. The process begins at block 400 with receipt of the RoT. There are two possible control paths, one for admitting new calls and one for updating data rates. In the event that a mobile device 110 attempts to begin a new call, control is routed to the call admission block 405 where the RoT is compared to a preselected threshold. If the RoT presently exceeds the threshold, then the base station 120 refuses to accept the new call and generates a message to the requesting mobile device 110 at block 410 indicating that it cannot accept the new call. Alternatively, if the RoT is presently below the threshold, then the base station 120 accepts the new call and generates a message to the requesting mobile device 110 at block 410 indicating that it accepts the new call.

Alternatively, if the mobile device 110 requests to transmit data at a new, higher rate, then control transfers to Data Rate Control Block 415 where the RoT is compared to a preselected threshold. Those skilled in the art will appreciate that in some embodiments of the present invention the preselected thresholds used in blocks 405 and 415 may differ. That is, in some applications the threshold used for admitting a new call may be different than the threshold used to determine if the data rate may be raised. If the RoT presently exceeds the threshold, then the base station 120 refuses to allow the mobile device 110 to transmit at the new, higher rate. At block 420, the base station 120 sends a signal to the requesting mobile device, indicating that it cannot accept data at the new, higher rate. Alternatively, if the RoT is presently below the threshold, then the base station 120 accepts the higher data rate and generates a message to the requesting mobile device 110 at block 420, indicating that the mobile device may begin transmitting at the new, higher rate.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 220 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling a wireless communications system, comprising:
   receiving a first and second diversity signal over a common channel;
   determining a signal strength for the first and second diversity signals;
   determining a noise floor for the first and second diversity signals;
   determining a signal strength rise for the first and second diversity signals based on the measured signal strength and estimated noise floor of the first and second diversity signals respectively; and
   determining rise over thermal based on the determined signal strength rise of the first and second diversity signals, wherein determining rise over thermal based on the determined signal strength rise of the first and second diversity signals further comprises combining the determined signal strength rise of the first and second diversity signals using a weighted algorithm.

2. A method, as set forth in claim 1, wherein determining the signal strength for the first and second diversity signals further comprises measuring the signal strength for the first and second diversity signals.

3. A method, as set forth in claim 1, wherein determining the signal strength for the first and second diversity signals further comprises measuring the signal strength for the first and second diversity signals.

4. A method, as set forth in claim 1, wherein determining rise over thermal based on the determined signal strength rise of the first and second diversity signals further comprises averaging the determined signal strength rise of the first and second diversity signals.

5. A method, as set forth in claim 1, wherein determining rise over thermal based on the determined signal strength rise of the first and second diversity signals further comprises selecting the highest one of the determined signal strengths of the first and second diversity signals using a weighted algorithm.

6. A method, as set forth in claim 1, wherein determining signal strength rise for the first and second diversity signals based on the measured signal strength and estimated noise floor of the first and second diversity signals respectively further comprises determining signal strength rise by subtracting estimated noise floor from the measured signal strength.

7. A method for controlling a wireless communications system, comprising:
   determining a signal strength rise for a first diversity signal based on a signal strength and noise floor of the first diversity signal;
   determining a signal strength rise for a second diversity signal based on a signal strength and noise floor of the second diversity signal; and
   determining rise over thermal based on the determined signal strength rise of the first and second diversity signals, wherein determining signal strength rise for the first diversity signal based on the signal strength and noise floor of the first diversity signal further comprises determining signal strength rise for the first diversity signal by subtracting the noise floor of the first diversity signal from the signal strength of the first diversity signal and, wherein determining signal strength rise for the first diversity signal by subtracting the noise floor from the signal strength further comprises determining signal strength rise for the first diversity signal by subtracting an estimated noise floor of the first diversity signal from a measured signal strength of the first diversity signal.

8. A method for controlling a wireless communications system, comprising:
   determining a signal strength rise for a first diversity signal based on a signal strength and noise floor of the first diversity signal;
   determining a signal strength rise for a second diversity signal based on a signal strength and noise floor of the second diversity signal; and
   determining rise over thermal based on the determined signal strength rise of the first and second diversity signals, wherein determining signal strength rise for the second diversity signal based on the signal strength and noise floor of the second diversity signal further comprises determining signal strength rise for the second diversity signal by subtraction the noise floor of the second diversity signal from the signal strength of the second diversity signal, and, wherein determining signal strength rise for the second diversity signal by subtracting the noise floor of the second diversity signal from the signal strength of the second diversity signal further comprises determining signal strength rise for the second diversity signal by subtracting an estimated noise floor of the second diversity signal from a measured signal strength of the second diversity signal.

9. A method for controlling loading in a wireless communications system, comprising:
   receiving a request to provide a service that increases loading;
   determining signal strength rise for a first diversity signal based on a signal strength and noise floor of the first diversity signal;
   determining signal strength rise for a second diversity signal based on a signal strength and noise floor of the second diversity signal;
   determining rise over thermal based on the determined signal strength rise of the first and second diversity signals;
   comparing the rise over thermal to a preselected setpoint; and
   denying the request to provide the service based on the rise over thermal exceeding the preselected setpoint.

10. A method, as set forth in claim 9, wherein determining rise over thermal based on the determined signal strength rise of the first and second diversity signals further comprises averaging the determined signal strength rise of the first and second diversity signals.

11. A method, as set forth in claim 9, wherein determining rise over thermal based on the determined signal strength rise of the first and second diversity signals further comprises combining the determined signal strength rise of the first and second diversity signals using a weighted algorithm.

12. A method, as set forth in claim 9, wherein determining rise over thermal based on the determined signal strength rise of the first and second diversity signals further comprises selecting the highest one of the determined signal strengths of the first and second diversity signals using a weighted algorithm.

13. A method, as set forth in claim 9, wherein determining signal strength rise for the first diversity signal based on the signal strength and noise floor of the first diversity signal further comprises determining signal strength rise for the first diversity signal by subtracting the noise floor of the first diversity signal from the signal strength of the first diversity signal.

14. A method, as set forth in claim 13, wherein determining signal strength rise for the first diversity signal by subtracting the noise floor from the signal strength further comprises determining signal strength rise for the first diversity signal by subtracting an estimated noise floor of the first diversity signal from a measured signal strength of the first diversity signal.

15. A method, as set forth in claim 9, wherein determining signal strength rise for the second diversity signal based on the signal strength and noise floor of the second diversity signal further comprises determining signal strength rise for the second diversity signal by subtracting the noise floor of the second diversity signal from the signal strength of the second diversity signal.

16. A method, as set forth in claim 15, wherein determining signal strength rise for the second diversity signal by subtracting the noise floor of the second diversity signal from the signal strength of the second diversity signal further comprises determining signal strength rise for the second diversity signal by subtracting an estimated noise floor of the second diversity signal from a measured signal strength of the second diversity signal.

* * * * *